W. CORFIELD.
Egg-Carriers.
No. 154,845. Patented Sept. 8, 1874.
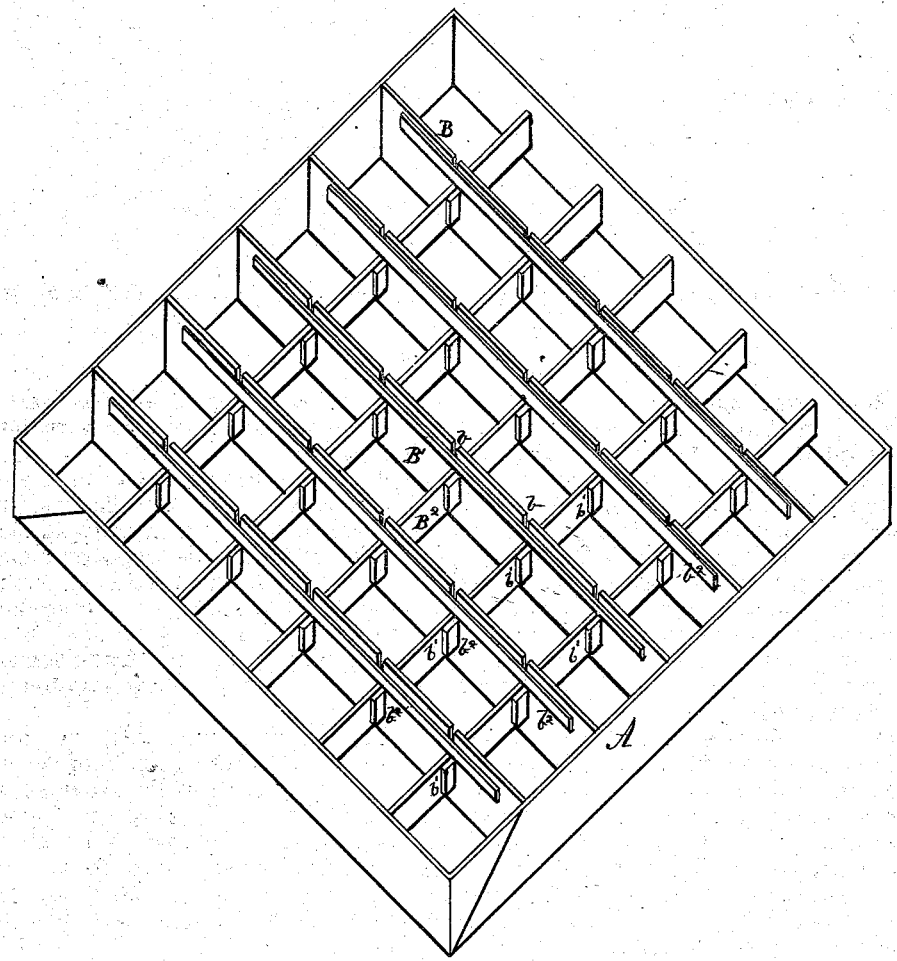
Witnesses
Eugene P. Eadson
J. B. Connolly
Inventor
William Corfield
By Connolly Bros.
Attorneys.

UNITED STATES PATENT OFFICE.

WILLIAM CORFIELD, OF PHILADELPHIA, PENNSYLVANIA, ASSIGNOR TO GILBERT R. TUCKER, OF SAME PLACE.

IMPROVEMENT IN EGG-CARRIERS.

Specification forming part of Letters Patent No. 154,845, dated September 8, 1874; application filed May 19, 1874.

*To all whom it may concern:*

Be it known that I, WILLIAM CORFIELD, of Philadelphia, in the county of Philadelphia and State of Pennsylvania, have invented a certain new and useful Improvement in Egg-Carriers; and I do hereby declare the following to be a full, clear, and exact description of the invention, such as will enable others skilled in the art to which it pertains to make and use it, reference being had to the accompanying drawings, which form part of this specification, in which the figure is an isometrical perspective.

My invention consists in the novel construction and combination of parts, as hereinafter described and claimed.

In the accompanying drawing, A represents one of a series of trays to be placed in the transportation-case. These trays are to be made of pasteboard or equivalent material, and are designed to have a depth of about two inches. B represents the partitions therein formed by the crossing of the strips $B^1$ and $B^2$. The strips $B^1$ are slit or sawed, as shown at $b$, to permit the passage of the strips $B^2$, which are provided with retaining-stays $b^1$, arranged on opposite sides, as shown. $b^2$ represents a strip pasted longitudinally upon the partitions $B^1$ to prevent the partitions $B^2$ from coming out.

With this construction the trays may be lifted bodily out of the case, taking the eggs with them, or the partitions alone may be removed, allowing the eggs to remain in the trays. While the partitions remain in the trays they will retain the rectangular arrangement shown in the drawing; but when removed therefrom they may be compactly folded on the principle of the lazy-tongs.

I claim—

The combination, with the longitudinal strips $B^1$, provided with vertical slits $b$, and the transverse strips $B^2$, provided with vertical stays $b^1$, of the strips $b^2$, applied to the longitudinal strips above the transverse ones, as and for the purpose set forth.

In testimony that I claim the foregoing I have hereunto set my hand this 18th day of May, 1874.

WILLIAM CORFIELD.

Witnesses:
M. DANL. CONNOLLY,
JNO. A. BELL.